United States Patent [19]

Bledsoe et al.

[11] Patent Number: 4,809,243
[45] Date of Patent: Feb. 28, 1989

[54] STREAMER CABLE

[75] Inventors: Steven W. Bledsoe; Alan D. McMurry, both of Friendswood, Tex.

[73] Assignee: Western Atlas International, Inc., Houston, Tex.

[21] Appl. No.: 121,271

[22] Filed: Nov. 16, 1987

Related U.S. Application Data

[63] Continuation of Ser. No. 915,060, Oct. 3, 1986, abandoned.

[51] Int. Cl.⁴ .............................................. G01V 1/38
[52] U.S. Cl. ...................................... 367/154; 367/20
[58] Field of Search ............... 367/20, 106, 130, 149, 367/153, 154, 155, 171, 173, 176; 114/253, 254; 174/101.5; 181/110–112

[56] References Cited

U.S. PATENT DOCUMENTS

| | | | |
|---|---|---|---|
| 2,825,039 | 2/1958 | Schurman et al. | 367/154 X |
| 3,375,324 | 3/1968 | Miller | 174/101.5 |
| 3,434,104 | 3/1969 | Stapleton et al. | 367/154 |
| 3,480,907 | 11/1969 | King | 367/154 |
| 3,739,326 | 6/1973 | Kerr et al. | 367/159 |
| 3,744,016 | 7/1973 | Davis | 367/154 |
| 3,900,543 | 8/1975 | Davis | 367/154 X |
| 4,295,212 | 10/1981 | Swenson | 367/20 |
| 4,471,474 | 9/1984 | Fields | 367/149 |
| 4,477,887 | 10/1984 | Berni | 367/20 |
| 4,491,939 | 1/1985 | Carpenter | 367/154 X |
| 4,570,248 | 2/1986 | Assard | 367/153 X |

FOREIGN PATENT DOCUMENTS

| | | | |
|---|---|---|---|
| 2838577 | 3/1979 | Fed. Rep. of Germany | 174/47 |
| 2145226 | 3/1985 | United Kingdom | 367/20 |

Primary Examiner—Brian S. Steinberger
Attorney, Agent, or Firm—Barry C. Kane

[57] ABSTRACT

A streamer-cable assembly is provided having a tubular outer jacket enclosing an open-cell foam case providing an axial hole for retaining a plurality of pressure sensors. A plurality of off-axial holes provide passages for the transmission bundle. Longitudinal channels along the exterior receive stress members which provide longitudinal rigidity to the streamer. Cable noise associated with cable jerk, and cable-whip or vibration is radically reduced by the foam core and rigid stress members.

19 Claims, 2 Drawing Sheets

STREAMER CABLE

This application is a continuation of application Ser. No. 915,060 filed on Oct. 3, 1986 now abandoned.

BACKGROUND OF THE INVENTION

1. Field of the Invention

This invention relates to apparatti used to detect pressure waves propagating through a fluid and particularly to an improved low-noise streamer cable.

2. Description of the Related Art

A conventional streamer cable used in seismic exploration may consist of a water-tight jacket enclosing a plurality of pressure sensors disposed at known intervals, depth transducers, and electrical and optical conductors extending through a series of bulkheads. The bulkheads also receive and are anchored to a plurality of steel or nylon stress members extending therethrough. The stress members absorb the strain of towing, thus preventing the cable jacket from stetching and eventually rupturing. The bulkheads provide a cylindrical shape to the streamer cable jacket, separate the stress members from each other, and may be used to protect the enclosed pressure sensors. The streamer cable often is filled with a noncorrosive light kerosene to provide neutral buoyancy while in the water. A few streamer cable designs have employed a closed-cell isocyanurate foam to provide buoyancy and to protect the enclosed sensors from crushing impacts, but closed-cell structure streamer cables are restricted to limited depths of operation.

Conventional streamer cables suffer from substantially high amounts of background noise while under tow. Movement of the streamer cable through the water may result in cable noise on the order of 5 to 10 microvolts. A percentage of this noise may be attributed to sources away from the cable such as the propellers of the ship and the breaking waves in a rough sea. The remainder of the noise is generated by the cable itself.

Two mechanisms are generally believed to be responsible for cable-generated noise. In the first mechanism, the cable is subject to irregular towing tension resulting in cable jerk. Shock from cable jerk propagates along the stress members to the bulkheads which in turn generate pressure waves in the cable oil. The pressure waves propagate along the length of the cable section with the cable jacket acting as a wave guide. Rarefractional waves also develop within the cable. The multiplicity of pressure waves and/or rarefractional waves (hereafter called tube waves) are detected by the enclosed pressure sensors as background noise. The second mechanism of generating cable noise may result from the cable moving laterally to the towing direction. That is to say the cable may whip or vibrate; the motion having a range of amplitudes and wave lengths. Cable whip causes the cable jacket to shift about the bulkheads causing vibration to be transferred to the cable oil. Additionally, the cable jacket may impact one or more of the stress members thus generating a pulse which is detected by the sensors. In addition to cable whip, cable noise is generated by vibration of the stress members. Cable jerk pulls the stress members taught from the relaxed position, setting them to vibrate and generate noise.

It is preferred that a streamer cable have substantially zero background noise while in tow, but if this is not readily attainable, it is most desirable to reduce background noise as much as possible.

SUMMARY OF THE INVENTION

It is a primary object of this invention to provide a low-noise streamer cable.

It is another object of this invention to provide a streamer cable having a greater longitudinal rigidiy to reduce cable whip and vibration.

It is yet another object of this invention to provide a streamer cable which is substantially incapable of having tube waves propagate therein.

The instant invention may have a flexible tubular jacket enclosing a plurality of pressure sensors disposed at known intervals along its length, all interconnected to a recording and control unit aboard a towing vehicle by a transmission bundle. A unitary, open cell foam insert may be enclosed within the jacket and enclose the plurality of pressure sensors so as to physically locate each along the axis of the cable. A plurality of off-axial holes each extending the length of the inset contain a transmission bundle. A plurality of rigid stress members are longitudinally disposed within the jacket and exterior the insert, each containing a steel or nylon cable extending the length thereof. Disposed around the insert and inside of the strips at known intervals may be an annular locator for maintaining the radial position of each stress member and assist in maintaining the cylindrical shape of the cable. The pressure sensors may each have a polyvinylchloride (PVC) housing which may support the sensors within the foam insert. The polyurethane insert, stress members and PVC cable jacket and sensor housing all act in concert to dampen tube waves and spurious pressure pulses resulting from cable movement.

BRIEF DESCRIPTION OF THE FIGURES

A better understanding of the benefits and advantages of my invention may be obtained from the appended detailed description and the drawings, wherein.

DETAILED DESCRIPTION OF A PREFERRED EMBODIMENT

Figure 1:
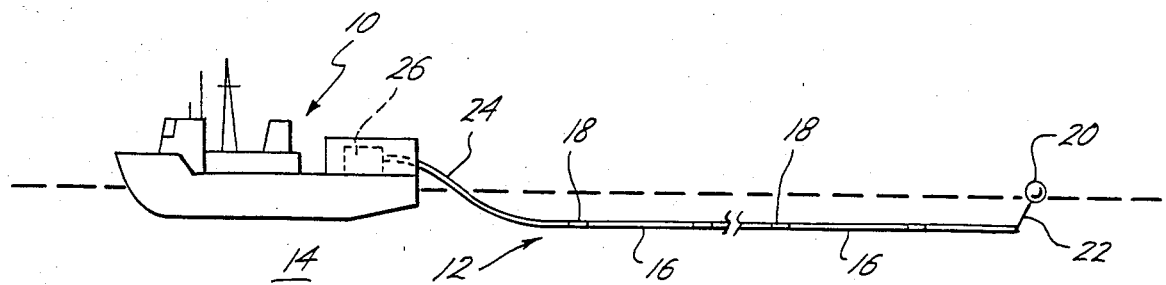
FIG. 1 is a generalized illustration of a ship towing the instant invention through a body of water.

In the following detailed desription and corresponding figures, like reference numerals indicate like components, wherein FIG. 1 generally illustrates a ship 10 towing a streamer cable 12 through a body of water 14. Streamer cable 12 may be of any desired length up to 3 kilometers or more. The length of the streamer cable 12 may be changed by adding or subtracting cable sections 16 interconnected to each other by connectors 18. The distal end of the streamer cable 12, with respect to the ship 10, may have a positioning buoy 20 coupled thereto by a length of cable 22 so that the location of the cable end may be determined visually or by radar. The proximal or near end of the streamer cable may be connected to the ship 10 by a lead-in cable section 24, which in turn is operably connected to a recording and control unit 26.

Figure 2:
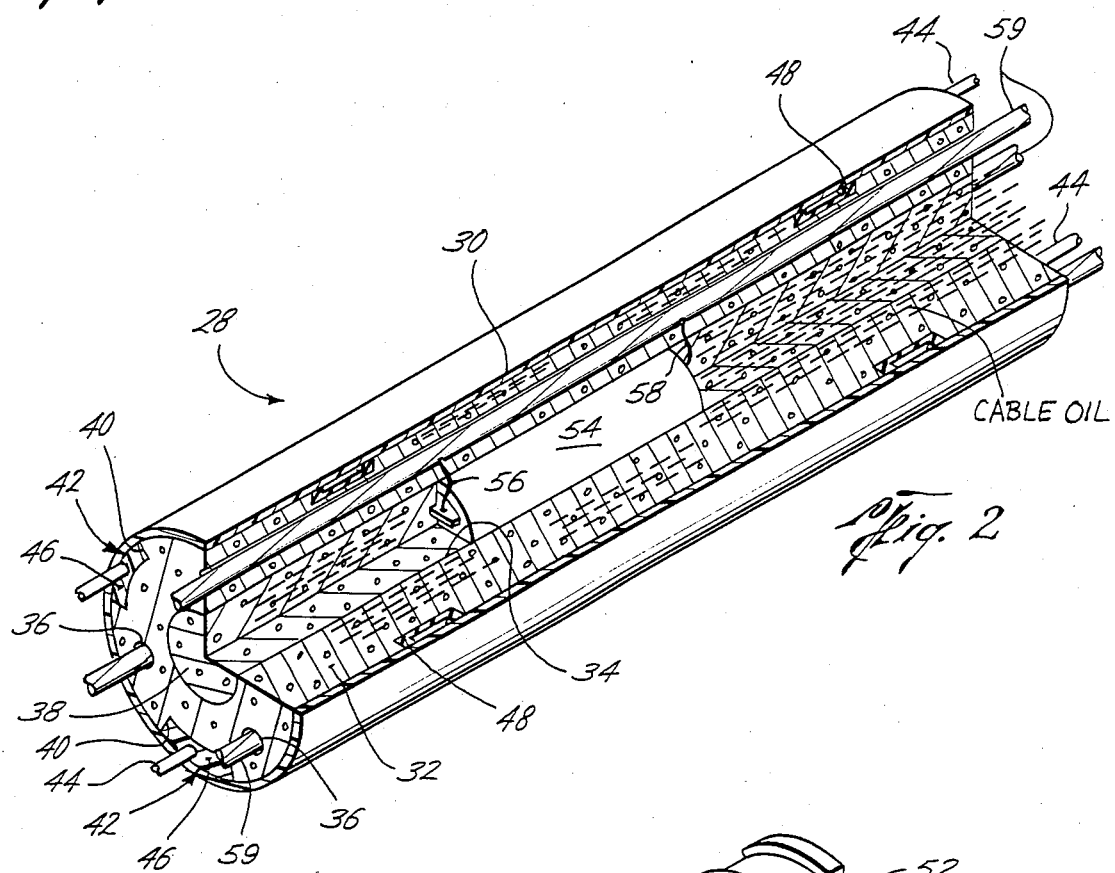
FIG. 2 is an isometric view in quarter cross section illustrating a portion of a seismic streamer cable employing one embodiment of this invention.

FIG. 2 is an isometric view of a streamer cable segment 28 from any one of the cable sections 16. Segment 28 is shown in quarter section to reveal the interior components.

In one embodiment of the instant invention, each cable section 16 may be comprised of a tubular outer jacket 30 enclosing a unitary foam-core 32. It is prefered that core 32 have an open-cell construction with approximately 30 cells per linear inch and extruded as a single piece. The core 32 may be made from polyuethane having a specific gravity substantially equal to 0.9 grams per cube centimeter (gm/cm$^3$), but other plastics may be used having essentially the same properties. The transverse shape of the core may vary but FIG. 2 illustrates generally a cylindrical shape having an axial hole 34 and three off-axial holes 36 running the length of the member. The holes are preferably cut into the core 32 during the extrusion process. A cylindrical plug 38 cut from the axial hole 34 remains therein while the off-axial cylindrical pieces may be removed. Defined along the exterior of core 32 may be a plurality of longitudinal channels 40 equidistant from each other. FIG. 2 illustrates 3 such channels, each located along the exterior at approximately 120 degrees from each other and positioned between the off-axial holes 36. Core 32 and plug 38 are easily cut to the desired length by scissors or a hot knife.

Figure 3:
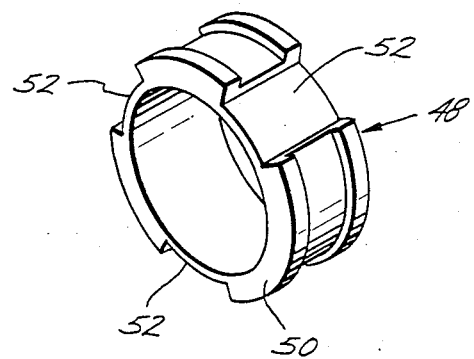
FIG. 3 is an isometric view of a locator which may be used in this invention.

Extending the length of each cable section 16 and received within each channel 40 of core 32 are stress members 42. Each stress member may be comprised of a twisted steel or nylon cable 44 within an extruded thermoplastic rubber shell 46. The shell 46 is preferably extruded directly over cable 44 in such a shape so as to fit snuggly within channel 40 inside jacket 30. The stress members 42 are maintained in radial relationship to each other by a locator 48 shown in FIG. 3. Locator 48 may be a plastic ring 50 molded from a polycarbonate blend to conform to the interior of jacket 30 and having channels 52 which align with channels 40.

Disposed within axial hole 34 at predetermined intervals along the cable section 16 may be a plurality of pressure sensors such as 54 shown in FIG. 2. It is preferred that a predetermined portion of the plug 38 be removed at these intervals and the sensor inserted. Each sensor 54 may be operably coupled to a predetermined set of conductors 56 and 58 comprising a portion of one of the transmission bundles 59 extending the length of the cable section through off-axial holes 36.

Figure 4:
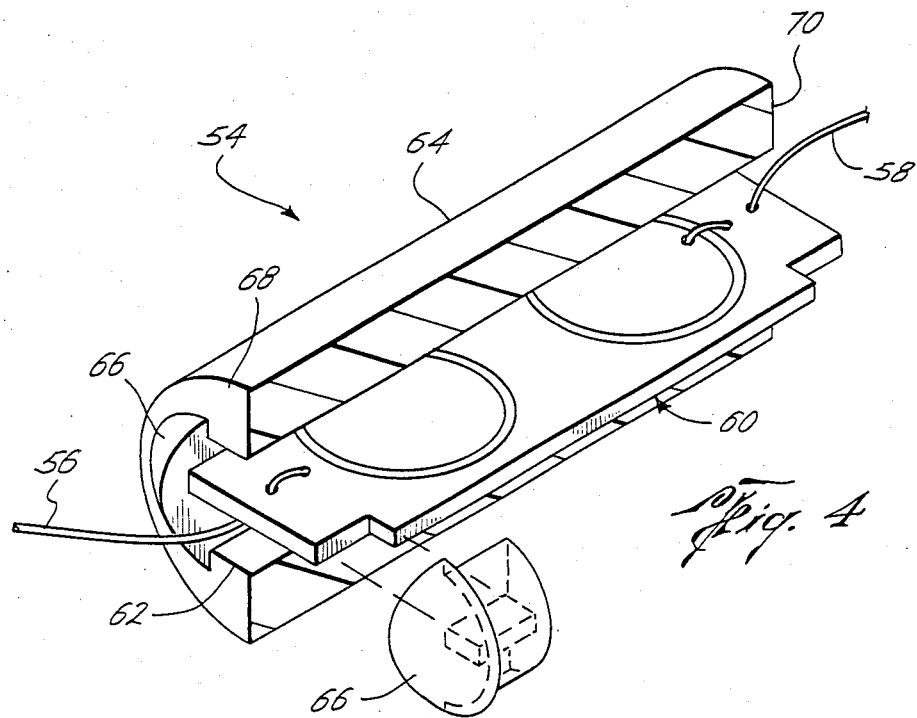
FIG. 4 is an isometric view in partial cross section illustrating an embodiment of a pressure-sensor assembly which may be employed in this invention.

FIG. 4 is an isometric view in partial cross section of a preferred pressure sensor 54. In the figure, the pressure sensor 54 may comprise a piezoelectric transducer 60 such as a WM2-036 hydrophone manufactured by the assignee of this invention. The hydrophone is preferably disposed within an axial hole 62 of a cylindrical housing 64 having an outside diameter substantially greater than the diameter of axial hole 34. Housing 64 also is preferably molded from polyvinylchloride (PVC) to form a resilient capsule. The hydrophone may be centrally located within hole 62 by a plurality of lugs or mounts 66 mounted to the hydrophone 60. Although piezoelectric hydrophones are disclosed other types of sensors such as fiber optic transducers or accelerometers may be used.

Figure 5:
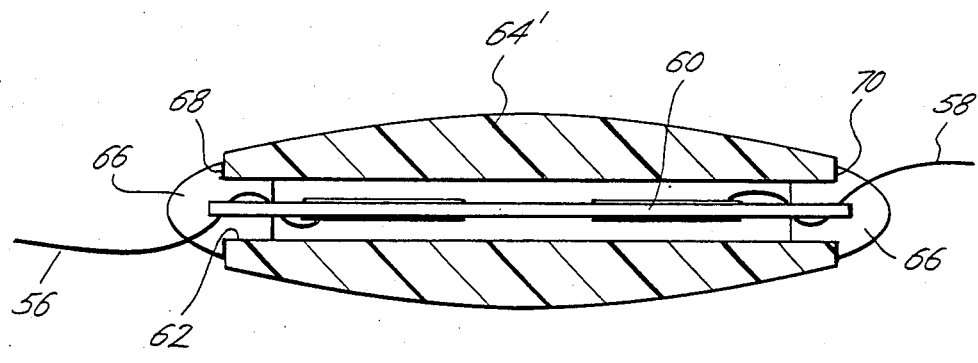
FIG. 5 is a side view of another embodiment of a pressure-sensor assembly employed in the instant invention.

FIG. 5 illustrates a side view of an alternate embodiment of housing 64 used to encapsulate a hydrophone such as 60. In general, housing 64' is substantially identical to housing 64 with the exception of the shape. Housing 64' preferably has conical ends 68 and 70 in contrast to the rather blunt ends of housing 64.

After all the components have been physically located with the polyurethane cable jacket 30 and sealed by the connectors 18 at each end, cable oil such as light kerosene is added (not shown). The streamer cable 12 may be deployed and towed behind the ship 10 in the normal manner. Acoustic waves generated by a nearby source and reflected from subsurface layers of the earth impinge upon the streamer cable and are transferred to the sensors 54 by the enclosed cable oil. The sensors 54 convert the received pressure pulse or pulses into electrical or optical signals which are transmitted through the bundles 59 to the recording and control unit 26.

Cable noise typically associated with conventional cables is radially reduced. Tube waves generated by cable jerk within the inventive cable are dispersed and dissipated by the polyurethane foam interior. The tubewave energy is greatly reduced or absorbed by the many small scale interferences of the tube wave with itself resulting from the many collisions with the open cell network. Each cell in the core 32 acts to redirect a fraction of each tube wave so as to collide with another fraction thus preventing the tube wave to propagate to the sensors 54. Noise that may reach sensor 54 is again reduced because of the absorbing tendency of the PVC housing 64 (64') surrounding the transducer 60. Tubewave noise originating near a sensor 54 may be reduced by being directed around the transducer by the conical ends 68 and 70 of housing 64' as well as being absorbed by the PVC from which it is made. As mentioned earlier, it is preferred that the cylindrical housing 64, 64' be made of PVC. This is because we found PVC has a greater characteristic for absorbing noise within the frequency spectrum of interest than any other materials tested; however, this is not to say that better materials do not exist. Cable noise associated with cable whip and/or vibration is also radially reduced because the stress members add flexual rigidity to the length of the cable reducing the transverse whipping motion. Vibration of the cable stress member is additionally damped by the thermoplastic rubber shell extruded thereabout, adding flexural rigidity to the cable section. Noise generated from vibration or cable whip which may develop is also absorbed by the polyurethane open cell foam interior.

For illustrative purposes, our invention has been described with a certain degree of specificity. Variations will occur to those skilled in the art but which may be included within the scope and spirit of this invention which is limited only by the appended claims.

We claim as our invention:
1. A streamer-cable assembly, comprising:
   (a) a streamer-cable jacket;
   (b) first and second means disposed within said streamercable jacket for damping internally-propagating tube waves, said second means comprising a resilient tubular capsule axially disposed within said first means;
   (c) means disposed within said streamer-cable jacket and adjacent said first damping means for providign longitudinal flexural rigidity to said streamer cable to reduce cable-whip and vibration;

(d) means extending through the flexural rigidity means for reducing tensional stress along the streamer cable;

(e) means disposed within said first and second damping means for detecting transient pressure pulses;

(f) means extending through said damping means for operably interconnecting said detecting means to a remote recording system; and (g) fluid means disposed within said cable-jacket and said damping means for providing buoyancy to said streamercable when deployed in a body of water.

2. A streamer-cable assembly as recited in claim 1, wherein said means for providing longitudinal flexural rigidity to said streamer cable comprises:

(a) a plurality of rigid stress members longitudinally disposed within said streamer-cable jacket; and (b) means disposed within said streamer-cable jacket at intervals for maintaining said stress members equidistant from each other.

3. A streamer-cable assembly as recited in claim 2, wherein each of said plurality of stress members comprises:

(a) a cable; and (b) a substantially rigid shell surrounding said cable and extending the length thereof.

4. A streamer-cable assembly as recited in claim 3, wherein said means for detecting transient pressure pulses comprises a plurality of pressure sensors disposed within said damping means at predetermined intervals.

5. The streamer-cable assembly as recited in claim 1, wherein said means for detecting transient pressure pulses are a plurality of piezoelectric transducers.

6. The streamer-cable assembly as recited in claim 1, wherein said means for detecting transient pressure pulses are a plurality of fiber-optic pressure transducers 7. The streamer-cable assembly of claim 1, wherein the first and second means disposed within said streamer-cable jacket for damping internally-propagating tube waves, comprises:

(a) an open cell foam core having between 10 and 100 cell pre linear inch substantially filling the streamer-cable jacket; and (b) a plurality of resilient tubular capsules axially disposed within the open cell foam core for retaining the detecting means within the streamer-cable assembly.

8. A streamer-cable assembly, comprising:

(a) a cable jacket having a first and a second end;

(b) first and second means disposed within said jacket for damping internally-propagating tube waves, said first damping means comprising an open-cell foam core substantially filling said cable jacket and said second damping means comprising a resilient tubular capsule axially disposed within said open-cell foam core;

(c) means disposed within said jacket and adjacent said damping means for absorbing tensional stress and providing longitudinal flexural rigidity to said streamer-cable assembly;

(d) means, enclosed within the resilient tubular capsule, for detecting transient pressure pulses;

(e) means extending through said first and second damping means for operably coupling said detecting means to a recording and control unit; and (f) a cable oil substantially filling said cable jacket and saturating said damping means.

9. A streamer-cable assembly as recited in claim 8, wherein said means for detecting transient pressure pulses comprises a plurality of pressure sensors axially disposed at predetermined intervals within said cable jacket.

10. A seismic-streamer cable, comprising:

(a) a cable jacket;

(b) an open-cell foam core substantially filling said jacket for damping internally-propagating tube waves within said jacket;

(c) a plurality of resilient tubular capsules axially located within the open-cell foam core for reflecting internally propagating tube waves (d) a plurality of stress members disposed in and extending the length of said jacket for absorbing tensional stress and providing longitudinal flexural rigidity to said seismic-streamer cable;

(e) a plurality of seismic sensors, each enclosed within a resilient tubular capsule, for detecting transient pressure pulses; and (f) a cable oil filling said cable jacket and said open-cell foam core for providing neutral buoyancy to said seismic-streamer cable while deploying in a body of water.

11. The seismic-streamer cable recited in claim 10, further comprising means for operably interconnecting said means for detecting transient pressure pulses to a recording and control unit.

12. A seismic-streamer cable for use in a body of water, comprising:

(a) a tubular cable jacket:

(b) a flexible open-cell foam core within said cable jacket for substantially dissipating tube wave energy propagating within said cable jacket;

(c) a plurality of resilient tubular capsules, each having a longitudinal hole, axially disposed within said open-cell foam core for absorbing and reflecting tube wave energy propagating within said cable jacket;

(d) a plurality of stress members disposed longitudinally within said cable jacket for providing longitudinal flexural rigidity to said streamer cable to reduce cable whip and vibration while deployed in said body of water;

(e) a plurality of hydrophones, each substantially enclosed within one of the resilient tubular capsules for detecting transient pressure waves;

(f) a cable oil filling said tubular jacket and said open-cell foam core for providing neutral buoyancy to said streamer cable while deployed in said body of water; and (g) means longitudinally extending through said tubular jacket for interconnecting said plurality of hydrophones to a remote recording and control unit.

13. The streamer-cable assembly as recited in claim 12, wherein each of said plurality of stress members comprises:

(a) at least one strand of wire; and (b) a substantially rigid shell extruded about said strand and extending the length of said streamer-cable assembly for providing longitudinal rigidity to said cable assembly.

14. The streamer-cable assemble as recited in claim 13, further comprising means disposed within said tubular cable jacket at predetermined intervals for maintaining said stress members equidistant from each other.

15. The streamer-cable assembly as recited in claim 13, wherein the substantially rigid shell has a generally oblate cross section perpendicular to the length of the stress member.

16. The streamer-cable assembly as recited in claim 12, wherein each of said plurality of stress members, comprises:
(a) at least one strand of rope; and
(b) a substantially rigid shell extruded along the length of said strand and extending the length of said streamer-cable assembly for adding flexural rigidity to the length of said streamer-cable assembly.

17. The streamer-cable assembly as recited in claim 12, wherein said flexible open-cell foam core may have between 10 and 100 cells per linear inch.

18. The seismic-streamer cable as recited in claim 12, wherein said plurality of hydrophones are piezoelectric transducers.

19. The seismic-streamer cable as recited in claim 12, wherein said plurality of hydrophones are fiber optic transducers.

* * * * *